(12) United States Patent
O'Connell et al.

(10) Patent No.: US 6,922,761 B2
(45) Date of Patent: Jul. 26, 2005

(54) METHOD AND SYSTEM FOR MIGRATING DATA

(75) Inventors: Mark O'Connell, Sint-Katelijne-Waver (BE); Zhiling Zheng, Durham, NC (US)

(73) Assignee: EMC Corporation, Hopkinton, MA (US)

(*) Notice: Subject to any disclaimer, the term of this patent is extended or adjusted under 35 U.S.C. 154(b) by 391 days.

(21) Appl. No.: 10/105,821

(22) Filed: Mar. 25, 2002

(65) Prior Publication Data
US 2003/0182525 A1 Sep. 25, 2003

(51) Int. Cl.[7] ............................................. G06F 12/00
(52) U.S. Cl. ..................... 711/162; 711/112; 711/100; 709/218; 709/221
(58) Field of Search .............................. 711/162, 112, 711/100; 709/218, 221

(56) References Cited

U.S. PATENT DOCUMENTS

| 6,266,679 | B1 | | 7/2001 | Szalwinski et al. |
| 6,442,601 | B1 | * | 8/2002 | Gampper et al. ........... 709/218 |
| 6,473,767 | B1 | | 10/2002 | Bailey et al. |
| 6,745,241 | B1 | * | 6/2004 | French et al. ............... 709/221 |
| 2002/0152194 | A1 | | 10/2002 | Sathyanarayan |

* cited by examiner

Primary Examiner—Kimberly McLean-Mayo
(74) Attorney, Agent, or Firm—A. Jose Cortina; Daniels Daniels & Verdonik, P.A.; R. Kevin Perkins

(57) ABSTRACT

Data is migrated from an original host storage system to another replacement host storage system with minimal client impact on a network. An original host storage system is connected directly to the replacement host storage system which is in turn connected to the network. Data migration occurs while allowing a client to access data in the original host storage system. When access is requested, the replacement host storage system determines if it resides locally or in the original host storage system. Depending on where the data resides, either the replacement host storage system acts on it or obtains it from the original host storage system.

20 Claims, 12 Drawing Sheets

METHOD AND SYSTEM FOR MIGRATING DATA

CROSS REFERENCE TO RELATED APPLICATIONS

This application is related to co-pending application Ser. No. 10/105,492 entitled "Method and System for Migrating Data while Maintaining Access to Data with Use of the Same Pathname," and co-pending application Ser. No. 10/105,976 entitled "Method and System for Migrating Data While Maintaining Hard Links," both concurrently filed herewith.

FIELD OF THE INVENTION

The invention relates to a method and system for migrating data from original host storage systems to replacement host storage systems. More particularly, the invention relates to a method and system of achieving such migration on a network, while maintaining continuous access to the data by clients on the network. In a further aspect, the invention relates to a method and system of migrating such data irrespective of whether the migration occurs on the network.

BACKGROUND OF THE INVENTION

Current data storage on a network is oftentimes arranged in what is known as a Network Attached System (NAS) in which a plurality of clients, for example, user terminals such as user computers, are connected to a network to a server or storage system which either has storage arrays built into the storage system, or are somehow connected to cabinets containing storage arrays. Examples of such servers might be a server such as is available from Sun Microsystems connected to a cabinet composed of a storage array such as those available under the names Symmetrix or Clariion available from EMC Corporation.

An alternative to such a server/storage combination would be a combined unit which includes storage array and front end host intelligence as a single package such as is available from EMC Corporation under the identifier IP4700. For the sake of consistency, all of these types of systems will interchangeably be hereafter referred to as a "host storage system." Such a system combines block storage and file protocols in one. Examples of network protocols employed are those which are readily known to those of ordinary skill in the art as NFS, CIFS (SMB), FTP, etc.

In such networks, a number of clients are connected on the network and actively access files, read them, write to them, create them, delete them, and perform other operations on the files in storage.

As previously discussed, the clients might be personal computers or stand-alone terminals, or other like systems having intelligence in order to operate on the client side of the protocols. The network can be a Ethernet-type network and can have switches. Similarly, it could be a fibre channel-type environment, i.e., anything that runs the network protocol on a fibre channel environment, i.e., IP (Internet Protocol) over fibre, is another environment alternative of how Network Attached Storage is implemented.

It is often the case that it is desirable to replace existing host storage systems for a number of reasons. For example, a system may become out of date and the network users may want to upgrade the system. A problem with replacing such a system is that it is undesirable to disrupt client access to the data. If the system desired to be replaced is disconnected from the network, then data, files and directories transferred from that system to the new system disconnected from the network, then client access is interrupted. Furthermore, the means of copying the data to the new system may not accurately preserve all file and filesystem attributes. For example, Windows/CIFS based tools will frequently not preserve file hard link attributes, while Unix/NFS based tools will typically not preserve ACL (Access Control List) attributes.

Currently, one way the data migration is done by taking the original host storage system off line. The data on the host storage system is moved to tape, and then copied onto the replacement host storage system. Alternatively, the replacement system can be connected directly to the network and the data could be copied over the network, but access to the data, files and directories is disabled for periods of up to several days. In addition, if the data migration fails in the middle of the operation, the migration has to restarted.

An alternative way of doing migration is to allow the clients to continue to access the original host storage system while copying to the replacement host storage system occurs. The problem with such a migration is that a copy is kept on the original system while trying to bring over all of the data. After the migration is completed, the two host systems have to be taken off the network for a final sweep to verify that all the data has been copied, which results in the system having to be taken off line.

These and other problems associated with migrating data, files and directories from one host storage system to another host storage system are avoided in accordance with the methods and systems described herein.

SUMMARY OF THE INVENTION

In accordance with one aspect, a method of migrating data from at least one original host storage system to a replacement host storage system on a network is described. A replacement host storage system is connected to a network and to an original host storage system. The original host storage system is then connected to the replacement host storage system and data is migrated from the original host storage system to the replacement host storage system. If a request is received from a client on the network concerning data stored in either the replacement host storage system or the original host storage system, it is determined if the data requested has been migrated from the original host storage system to the replacement host storage system. If the data has been migrated, the replacement host storage system acts on the client request. If the data has not been migrated, a search is conducted for the data on the original host storage system, and the data is copied to the replacement host storage system acting on the client request.

In one respect, the original host storage system may be disconnected from the network. Alternatively, it may remain connected, but its identity changed. In all cases the replacement host storage system assumes the identity of or impersonates the original host storage system.

To accomplish this operation, a database is built at the replacement host storage system which is indicative of what data has been migrated from the original host storage system. If the data has been migrated, the replacement host storage system file system then acts on the request. If the data has not been migrated, the original host storage system information about the file is determined and a request is sent to the original host storage system for access to the data.

The data migration database is stored in a persistent fashion, so any failures during movement of data in the migration process do not necessitate restarting the operation from start. Instead, data migration can be restarted from the point of failure.

In another aspect, a replacement host storage system is provided for migrating data from an original host storage system on a network to the replacement host storage system. The replacement host storage system includes a network protocol module for processing client requests when the replacement host storage system is connected to a network. Means for connecting the replacement host storage system, such as a port, adapters, etc., for connection to appropriate cabling, serves to allow the replacement host storage system to be directly connected to the original host storage system which may or may not be disconnected from the network. If not disconnected, the original host storage system's identity is changed and the replacement host storage system is configured to impersonate the original host storage system. Data is to be copied from the original host storage system to the replacement host storage system through such a connection.

A file system module is included for arranging and managing data on the replacement host storage system. A data migration module serves to migrate data from the original host storage system to the replacement host storage system when connected. The data migration module includes a data migration database for containing records of what data has been migrated to the replacement host storage system and where it resides. The data migration module is further configured for acting on a client request from a network relative to data, when the replacement host storage system is connected to the network, and connected to the original host storage system which has been disconnected from the network. The data migration module operates by determining from the database that the data is available from the replacement host storage system, and if so, having the file system module act on the data in response to the request. Alternatively, if the data migration module determines from the database that the data is not available from the replacement host storage system, it finds the data on the original host storage system, migrates it, and has the file system module act on the data in response to the request.

While this is occurring, it is possible that multiple work-items can be pending on a queue, waiting for processing. The replacement host storage system is programmed for handling the multiple work-items such that both in accordance with the method and how the system is programmed, the work-items are processed in the most time and resource efficient manner possible. A thread processing a work item will, when it is finished with the work-item, continue processing the next work item, unless the thread had blocked, in which case a notification was performed by the thread which caused the scheduling of a new thread to process the remaining work-items, and the original thread returns to the thread pool for further work.

In a yet still further aspect independent of whether migration occurs while connection to the network or between an original host storage system and a replacement host storage system disconnected from the network, there is also disclosed a method and system for preserving the pathnames to data that has been migrated such that when the replacement host storage system is accessed for data previously residing on the original host storage system, it can be accessed in the same manner as before. As before, the two systems are connected, the Access Control List is retrieved from the original host storage system for data, directories and files on the original host storage system file system which is to be migrated to the replacement host storage system. The data migration module database and method of migration provide for storing information about what data has been migrated to the replacement host storage system and where it resides. The data migration module is further configured and the method operates by storing on the replacement host storage system the original locations of the directories and files on the original host storage system for directories and files which were the subject of move or rename requests on the replacement host storage system. In this manner, the previous full pathname for accessing the data is preserved without disruption. This can be done in a fully networked environment, with connected clients performing unrestricted operations on the replacement host storage system, or as a separate stand-alone process in which neither of the two host storage systems are connected to a network, and only to each other.

In a yet still further aspect, it is desirable to preserve hard links between files associated with the same data. To achieve this, the attributes of a remote file having data to be migrated are retrieved from the original host storage system. From these attributes, if it is determined the file is linked to only one file, the file is created in the replacement host storage system and the data migrated. If it is determined the data in the file is linked to more than one file, the file id and file system id is then determined from the attributes retrieved from the original storage system. A search is conducted for the file id and file system id in the database. If the file id and file system id are found in the database, the replacement host storage system identifier for the file is retrieved and a hard link is created to the file associated with the file system identifier retrieved. If the file id and file system id are not found on the database, the file is created in the replacement host storage system, and the data associated therewith is migrated to the replacement host storage system. An identifier for the file, which uniquely identifies the file on the replacement system, is then stored in the database in a manner in which it is keyed by the file id and file system id, which uniquely identify the file on the original host storage system, as retrieved from the file attributes.

BRIEF DESCRIPTION OF THE DRAWINGS

Having thus briefly described the invention, the same will become better understood from the appended drawings, wherein.

DETAILED DISCUSSION OF THE INVENTION

Figure 1:
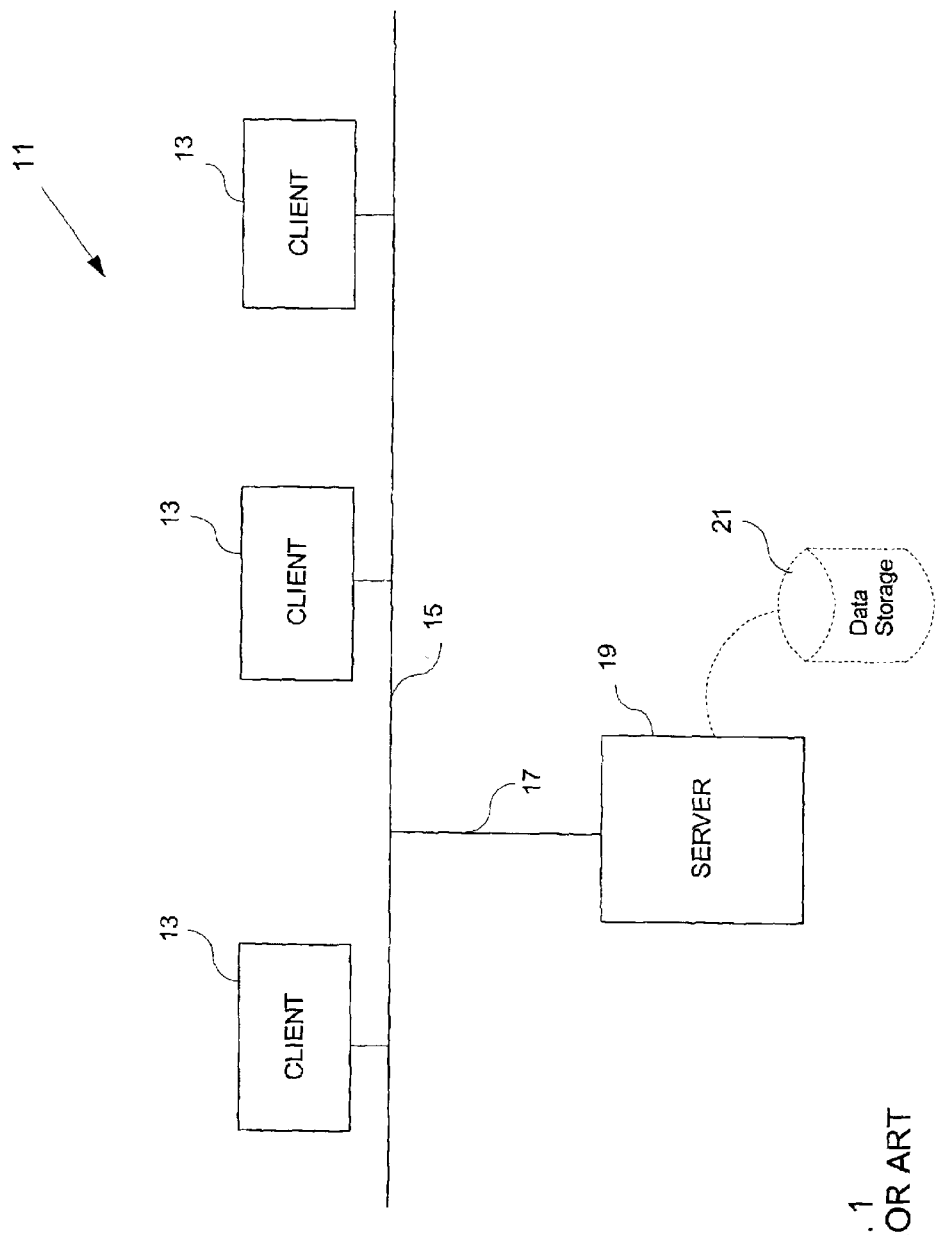
FIG. 1 is a block diagram of an existing network having Network Attached Storage System connected of the type on which the systems and methods described herein may be implemented.

FIG. 1 illustrates a network environment 11 employing Network Attached Storage Systems on which the method and system described herein may be implemented. The network environment 11 includes network connections 15 with a plurality of clients 13 connected to the network and through a separate connection 17 from the network to a Network Attached Storage System, i.e., host storage system 19 optionally made up of a server with attached data storage 21. As previously discussed, the network 15 may be an Ethernet network or it can also be a fibre channel. The host storage system 19 optionally includes a storage device or system 21 with one or more disks on the back-end which actually stores data in a file system format, with the host storage system 19 running protocols, i.e., network protocols for file sharing such as NFS, CIFS, or FTP as will be readily apparent to those of ordinary skill in the art.

Alternatively, the host storage system 19 might be made up of a single unit having onboard intelligence combining block storage and file protocol in one.

Thus, for example, the host storage system might be made up of a server 19 such as those available from Sun Microsystems with a back-end cabinet unit 21 such as those available under the names Symmetrix or Clariion from EMC Corporation. Alternatively, the storage system might be a stand-alone system which combines block storage and file protocols into one, such as is available from EMC Corporation under the name IP4700. Clients 13 might be personal computers or stand-alone terminals with some intelligence onboard in order to execute commands on the client side of the protocols and to process data.

Figure 2:
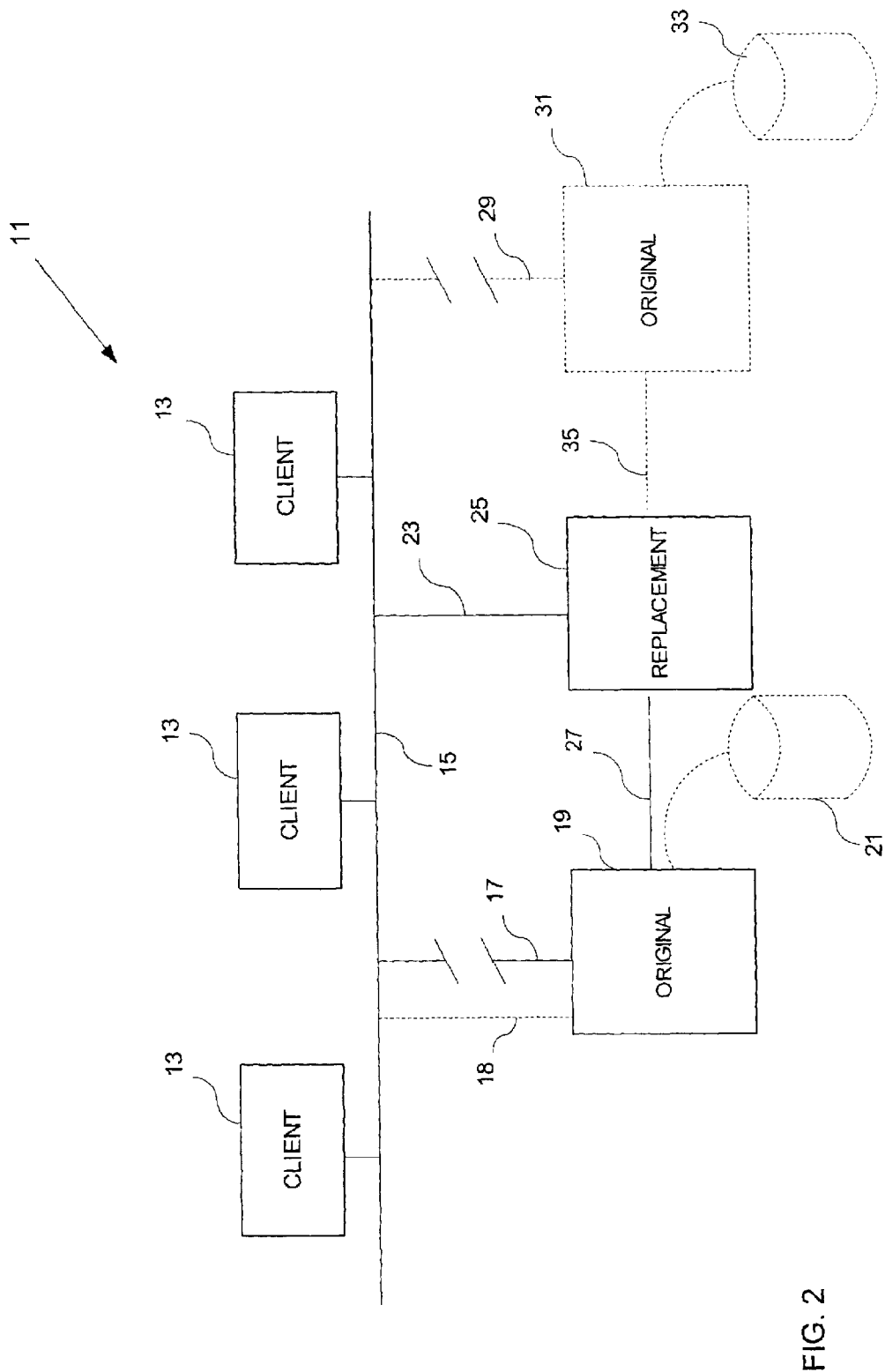
FIG. 2 is a block diagram illustrating the physical implementation of one system and method described herein for migrating data from one or more original host storage systems on a network.
Figure 3:
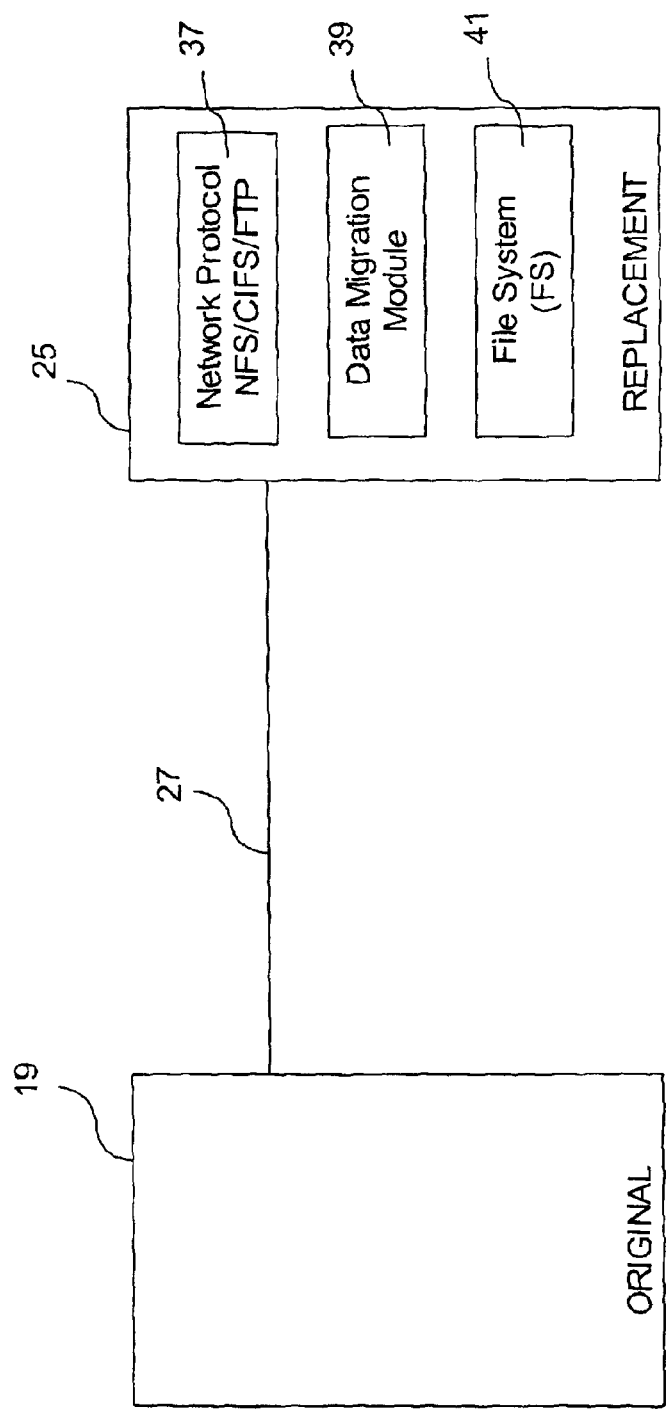
FIG. 3 is a more detailed block diagram of a replacement host storage system connected to an original host storage system for migrating data from the original host storage system to the replacement host storage system.

FIG. 2 illustrates how the method and system in accordance with the invention would be implemented in a network environment 11. A replacement host storage system 25 is connected directly through a connection 23 to the network 15. The connection 17 for the original host storage system 19 is severed, and the original host storage system 19 is connected directly to the replacement host storage system 25 through connection 27.

Alternatively, connection 18 may be maintained and the identity of the original host storage system 19 changed. In both cases, the replacement host storage system 25 is configured to impersonate the original host storage system 19. Optionally, it is also possible to connect multiple original host storage systems such as illustrated in dashed lines by original host storage system 31 through optional connection 35 to replacement host storage system 25. Thus, while data migration can occur from one original host storage system 19 to a replacement host storage system 25, it is possible in the case of a replacement host storage system having increased capacity such as one like that available from EMC Corporation under the name IP4700, which has multiple enhanced file systems running therein, it is possible to have up to ten original host storage systems per file system, and a total of up to one hundred original host storage systems 19 connected to the replacement host storage system 25 for conducting data migration, with connection 29 to the network 15 severed or maintained, as optionally desired, and previously described. The limits set forth are arbitrary for the IP4700, and may vary in implementation or with type of system used.

Thus, in implementing the method and system described herein, the replacement host storage system 25 impersonates the original host storage system 19. The replacement host storage system 25 includes a network protocol module 37 capable of handling the various protocols employed on the network 15. It also includes a data migration module 39 which is operative to migrate data, files and directories from the original host storage system 19, as well as having its own or multiple file systems 41 on which the data, files and directories from the original host storage system 19 are stored and managed. The data migration module 39 will also include a database populated with a table and other information as described hereinafter.

When the relationship is first established between the original host storage system 19 and the replacement host storage system 25, the table in the database is populated with a small record which indicates that there is no information about the original host storage system 19, and that all information will have to be obtained remotely. The information is associated with additional information in the form of what is known as a "tree id", which represents another set of records which indicates how to retrieve information from the original host storage system.

In the record is also stored the IP address of the original host storage system 19 so that the replacement host storage system 25 can communicate with the original host storage system 19.

Thus, as the method is implemented, all of the data on original host storage system 19 is eventually brought over to replacement host storage system 25 and at that point, the original host storage system 19 can be disconnected from the replacement host storage system 25.

While the data is being migrated, the clients 13 are allowed to access the data either directly from the replacement host storage system 25 or through the passing of a request to the original host storage system 19. At some point, when most of the data has been copied over, the replacement host storage system 25 is processing a majority of the requests from the clients 13. Thus, in accordance with the method and system described herein, there are two separate processes. One process is acting on client requests while a separate process is doing block-by-block copying and there is cross-intelligence between the processes where one process is now told by the other that it is not necessary to copy data. More specifically, when a process first attempts to copy a file, it checks the state inside the table in the database for the data migration module 39, and if the directory has already been copied, the process then does not make the copy.

Figure 4:
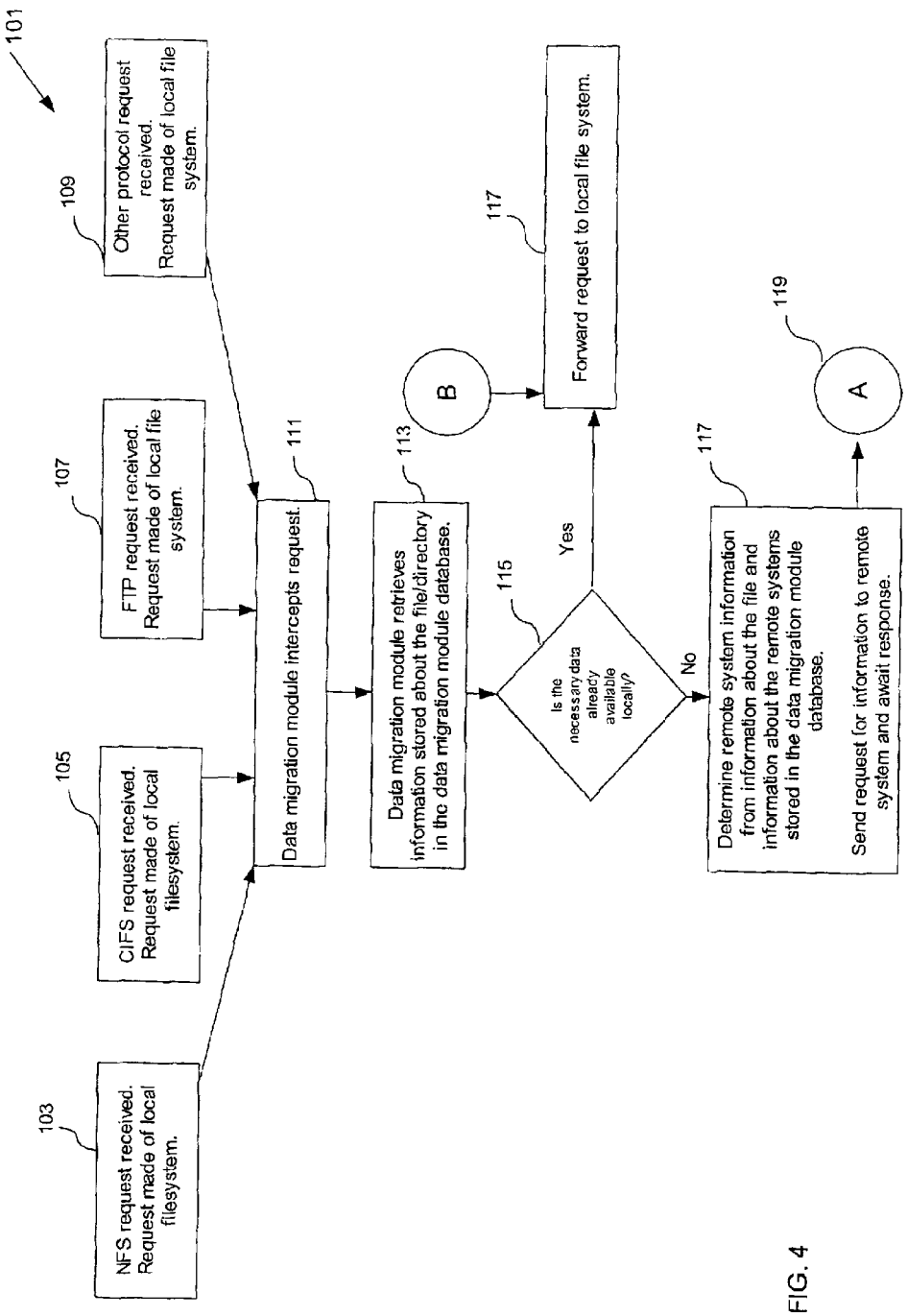
FIGS. 4 and 5 are flow diagrams illustrating the method of migrating data from at least one original host storage system to a replacement host storage system while the replacement host storage system is connected to a network, and during which access to the data by clients is maintained.
Figure 5:
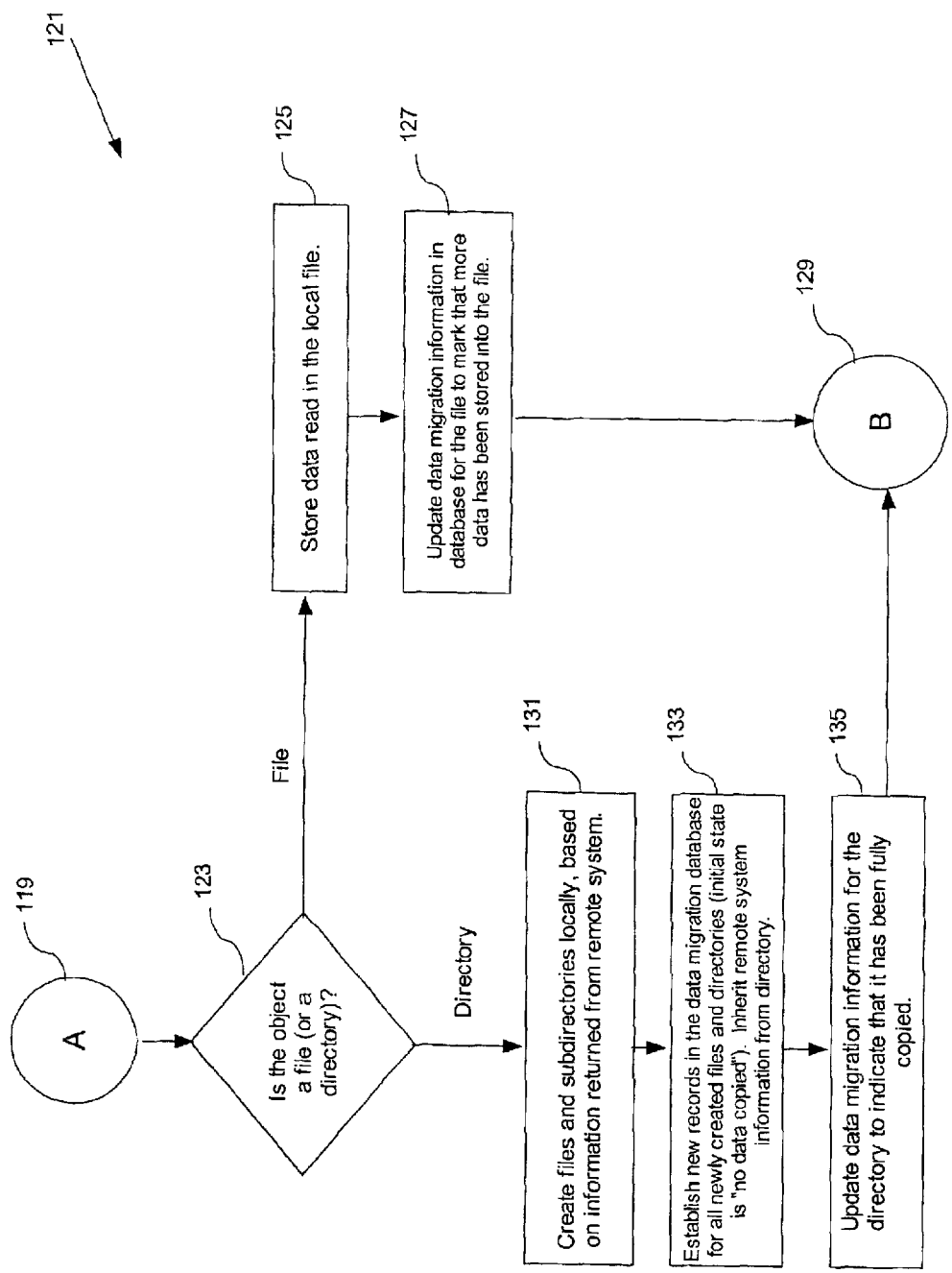

FIGS. 4 and 5 illustrate in greater detail the operation of the method and system, in particular, in flow chart 101 and 121 showing how one process operates on client requests. Client requests can come in in different network protocols as illustrated by blocks 103, 105, 107 and 109. In operation, the data migration module 39 intercepts the requests at step 111. The data migration module 39 then retrieves information stored about the file/directory in the data migration module database at step 113, and a query is made at step 115 about whether the necessary data has already been copied and is available locally at the replacement host storage system 25. If the answer is yes, the request is forwarded to the local file system 41 at step 117. If the answer is no, at step 117 a determination is made about the remote system information at original host storage system 19 from information about the file, and information about the remote system stored in the data migration module 39 database. Once this is done, a request for information is sent to the original host storage system 19 and replacement host storage system 25 awaits a response and proceeds to circle 119 in FIG. 5, where the second part of the process is illustrated.

From 119, a query is made at step 123 about whether the object or data sought to be copied is a file or a directory. If it is a file, it proceeds to step 125 and the data read is then stored in the replacement host storage system 25 file system 41, and the process then returns to circle 129 to step 117 which then forwards the request to the local file system 41 to be acted on.

If at step 123 it is determined that the object is a directory, at step 131 files and subdirectories are created locally based on information returned from the original host storage system 19. At step 133 new records are established in the database of the data migration module 39 for all newly created files and directories. The original host storage system 19 information is then inherited from the directory. Thereafter the process proceeds to step 135 where the data migration information is updated for the directory to indicate that it has been fully copied and passed then to circle 129 (B) to return to step 117 in FIG. 4.

Figure 6:
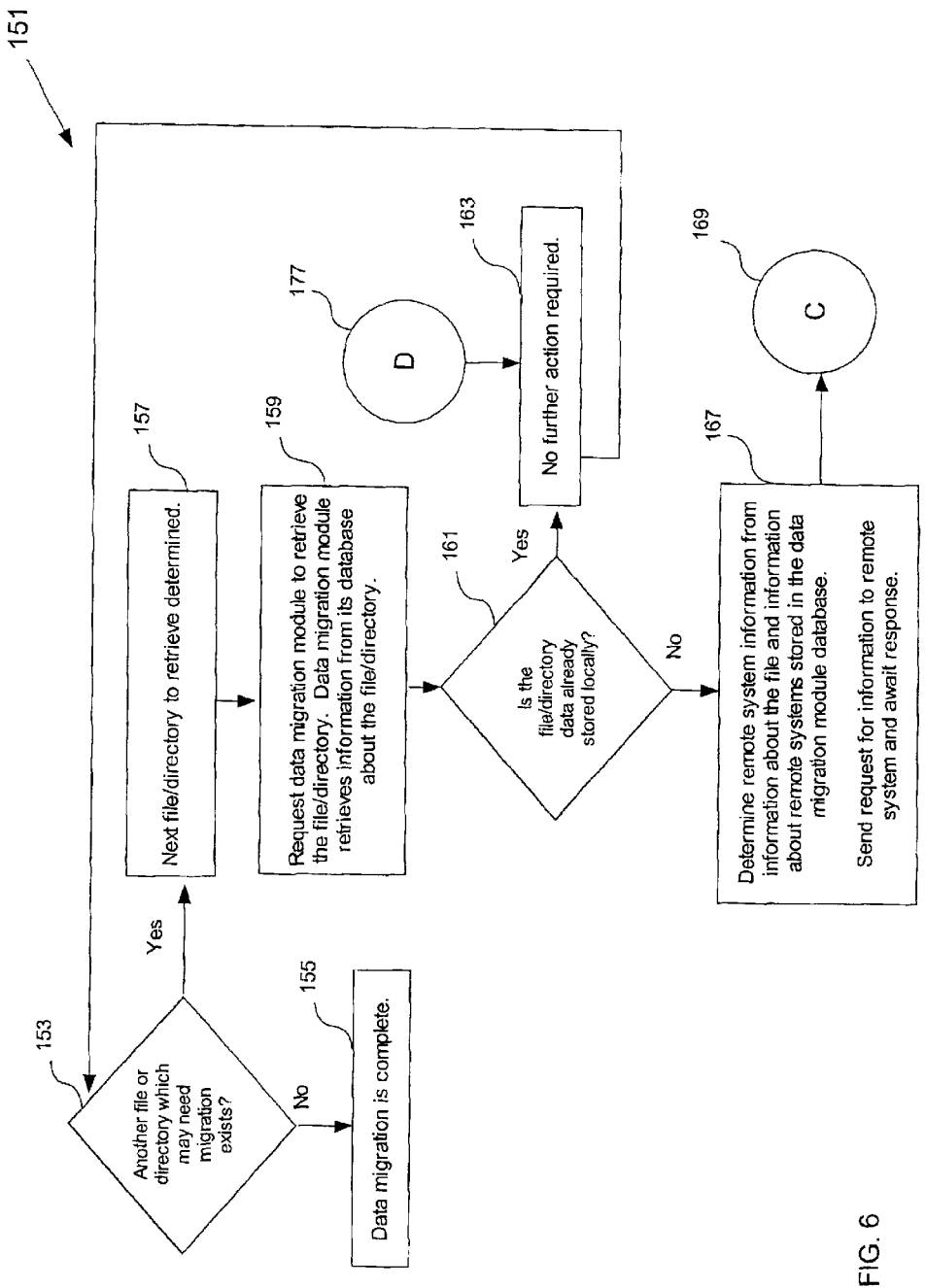
FIGS. 6 and 7 are flow diagrams illustrating how background migration of data is maintained in accordance with the method described herein simultaneous to acting on client requests as illustrated in FIGS. 4 and 5.
Figure 7:
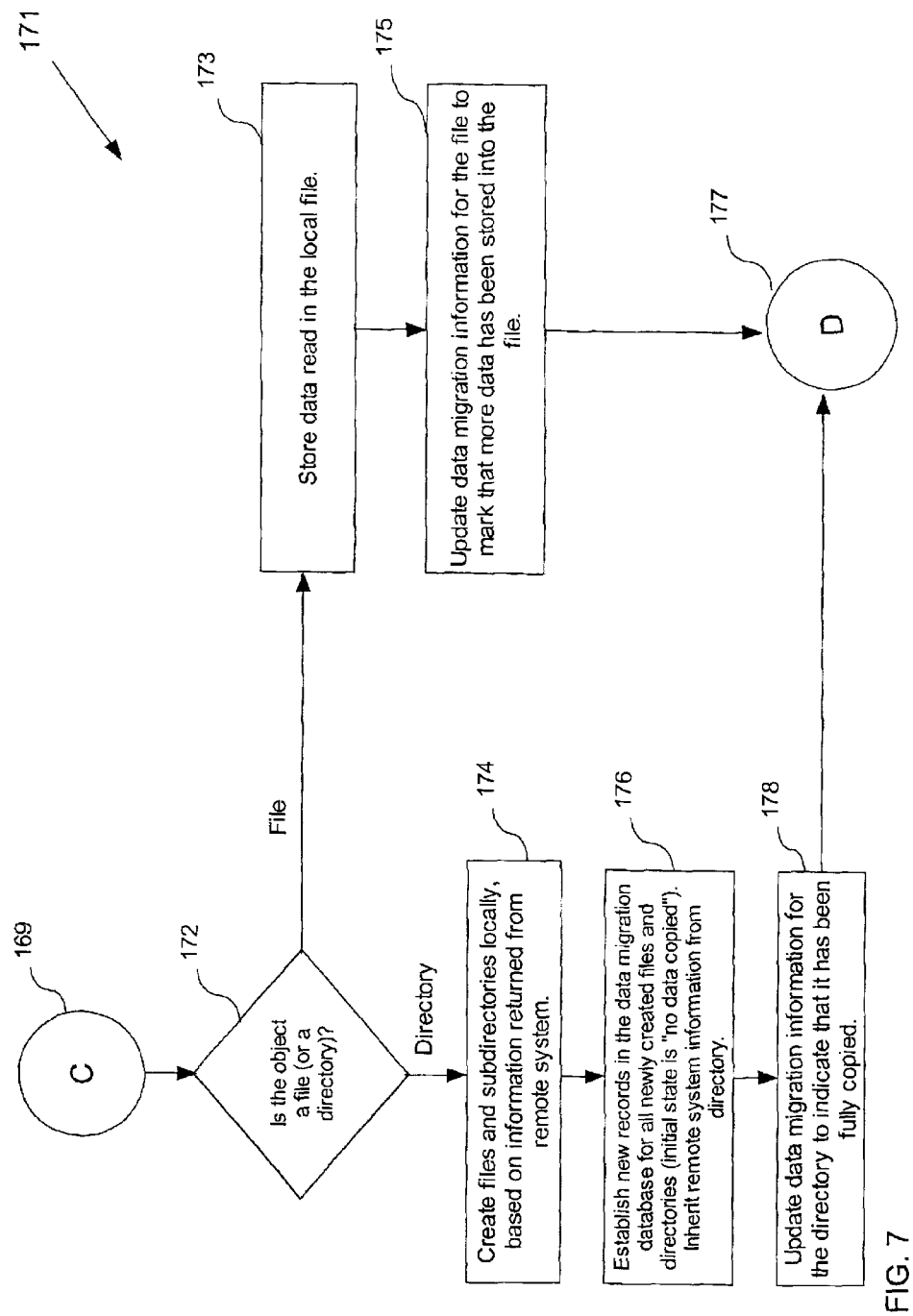

FIGS. 6 and 7 illustrate a second process in two flow charts 151 and 171 during which background block copying is being conducted in the absence of client requests. At step 153 a determination is made if another file or directory which may need migration exists. If the answer is yes, at step 157 the next file or directory to be retrieved is determined and the system continues to step 159 where a request is made of the data migration module 39 to retrieve the file or directory. The data migration module 39 retrieves the information from its database about the file or directory. At step 161 a determination is made about whether the file or directory data already is stored locally. If the answer is yes, then at step 163 no further action is required and the process returns back to step 153. At step 153 the same inquiry as before is made. In this case, if the answer is no, at step 155 it is determined that the data migration is complete and data migration is terminated.

Returning to step 161, if it is determined that the file or directory data is not already stored locally, at step 167, the replacement host storage system 25 data migration module 39 determines remote system information from information about the file and information about the remote system's, i.e., original host storage system 19, stored in the data migration module 39 database. The request for information is then sent to the original host storage system 19, the replacement host storage system 25 awaits a response and then proceeds to circle C identified as 169 in both FIGS. 6 and 7.

It is appropriate to note that the process as now illustrated in FIG. 7 is the same as FIG. 5. Thus, at step 172, a determination is made about whether the object is a file or directory. If it is a file, it proceeds to step 173 corresponding to step 125 of FIG. 5 and the data read is stored in the local file system 41. The process then proceeds to step 175 corresponding to step 127 of FIG. 5 in which the data migration information for the file is updated to mark that more data has been stored into the file, and the method then proceeds to step 177 identified as circle D and continuing as before in FIG. 6.

If at step 172 it is determined that the object is a directory, like step 131 of FIG. 5, at step 174 files and subdirectories are created locally, based on information returned from the original host storage system 119. At step 176, as in the case with step 133 of FIG. 5, new records are established in the data migration module 39 database for all newly created files and directories. The original host storage system information is inherited from the directory. At step 178, the data migration information for the directory is updated at the replacement host storage system 25 to indicate that it has been fully copied, in a manner similar to step 135 of FIG. 5.

Figure 8:
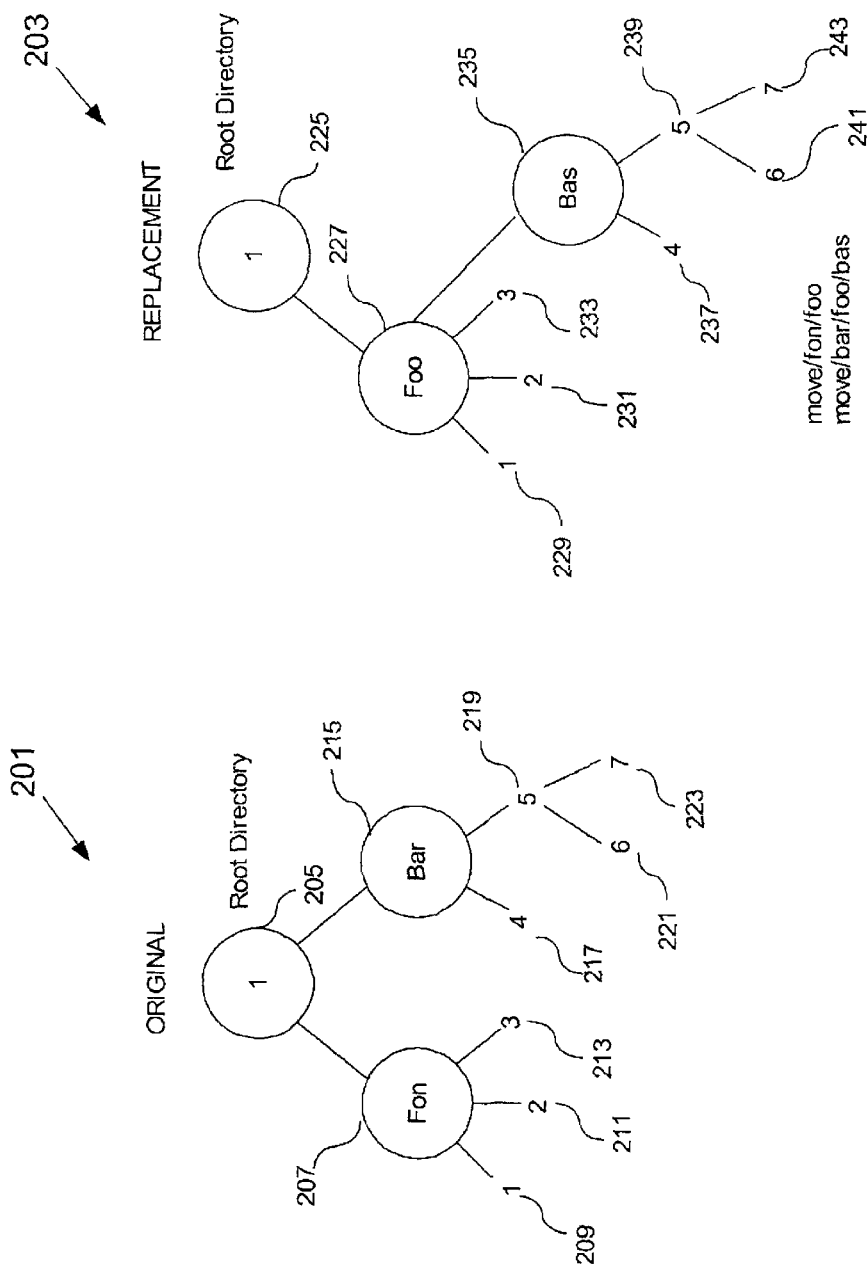
FIG. 8 is a schematic illustration showing directory trees for files on an original host storage system and on a replacement host storage system is created so as to maintain the original full pathname to data in a file on a replacement host storage system, as was maintained on an original host storage system.

Referring now to FIG. 8 when migrating data from one system to another, in order to retrieve certain information from an original host storage system 19, it is necessary to use the full pathname of a file or directory on the original host storage system 19. However, this is difficult to determine sometimes because files or directories may have been moved. In the case of the relationship between an original host storage system 19 and a replacement host storage system 25, a file or directory move will affect the file system on the replacement host storage system 25. Given that there is no easy way to determine from looking at the file system 41 in the replacement host storage system 25 what a corresponding file name, or corresponding full pathname to a file would be on the original host storage system 19, not knowing this can complicate the data migration. Thus, in accordance with a further aspect of the methods and systems, there is presented a way to store additional information concerning files or directories which are moved on the system to allow an original pathname to be determined and used to retrieve information.

FIG. 8 illustrates two directory trees. Directory tree 201 illustrates the tree for the original host storage system 19 and tree 203 illustrates the tree for the replacement host storage system. On the original host storage system 19 the root directory 205 includes directories 207 and 215 designated as Fon and Bar. Those directories include files 209–223. Thus, directory 201 illustrates the pathname where you start at the root and go all the way down. For example, a path would be /Bar/5/6, /Bar, or /Bar/5/7. It becomes desirable to port that path to the replacement host storage system 25. Referring now to tree 203, it is possible that originally somebody did an operation which caused root directory Fon and Bar to be brought over and renamed. Those two entries are created locally on the replacement host storage system 25 as 227 and 235, with /Fon being renamed /Foo and /Bar being renamed /Foo/Bas. The challenge is for the system is to remember that directory /Foo/Bas identified as 235 is really the same as /Bar 215 on the original host storage system 19. This occurs before all of the data has been migrated. It is important to appreciate that it is undesirable to duplicate all of the information from the original host storage system 19 and in accordance with the system and method, what is created are pointers back to the full pathname at the original host storage system 19.

It is important to appreciate that while this method and system for maintaining the pathname through the use of pointers can be implemented during data migration while connected to a network as previously discussed, it can also be implemented in a stand-alone environment where there is no connection to a network and data is just being migrated from one system to another. It is also important to appreciate that depending on the protocol employed, this aspect of the invention may not need to be implemented. For example, if the protocol is NFS, it is not required because NFS does not refer to files by file names. In this regard, it is noted that NFS stands for Network File System which is one of the core files sharing protocols. It associates a unique identifier with a file or directory and thus when directory Bar was moved over to Bas, that unique identifier was maintained with it. On the other hand, in CIFS, which refers to Common Internet File System, a Microsoft Corporation file sharing standard, otherwise sometimes referred to as SMB, i.e., Server Message Block, it becomes important to implement the system and method with such a protocol because CIFS does not implement a unique identifier.

Figure 9:
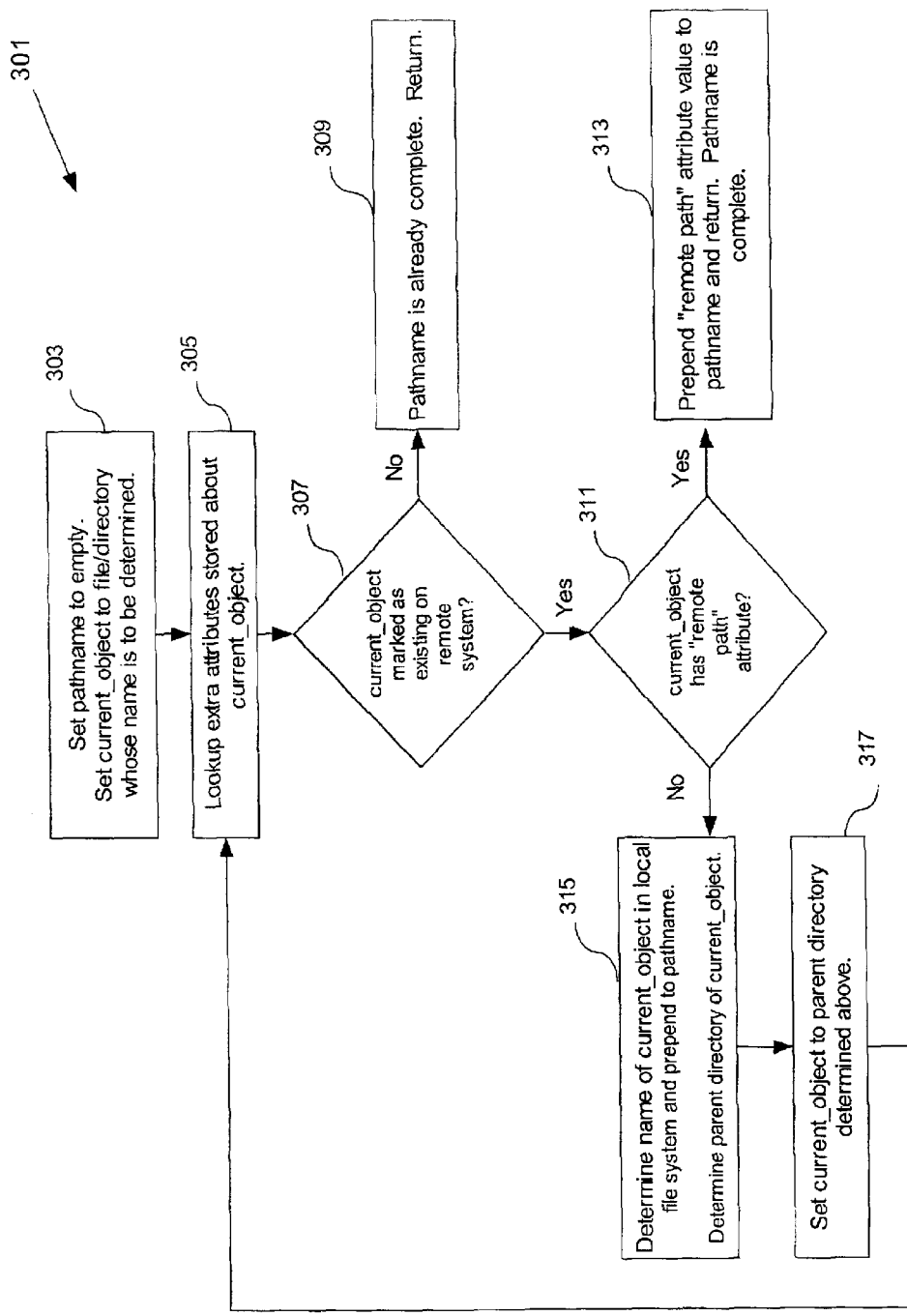
FIG. 9 is a flow diagram illustrating how the original pathname is maintained for a file containing data migrated to a replacement host storage system.

Having thus generally described this aspect of the systems and methods, FIG. 9 illustrates a flow chart 301 illustrating how the pathname on the original host storage system 19 can be maintained.

At step 303 the pathname is set to empty for a particular file or data and the current object is set to the file or directory whose name is to be determined. Extra attributes stored in the data migration module 39 database are looked up at step 305, and at step 307 the query is made as to whether the object is marked as existing on the original host storage system 19. If the answer is no, at step 309 it is determined that the pathname is already complete and the system returns to normal operation.

If the answer is yes, a query is made at step 311 as to whether the current object has the original host storage system 19 path attribute. If the answer is yes, the original host storage system 19 path attribute is then prepended as an attribute value to the pathname at step 313, and the pathname is then complete.

If the answer is no, at step 315 the name of the current object in the local or replacement host storage system 25 file system 41 is determined and prepended to the pathname, and the parent directory of the object is also determined, for example, such as Bas at 235 in FIG. 8. At step 317 the current object to the parent directory is set as determined at step 315, and the process returns back to step 305.

Figure 10:
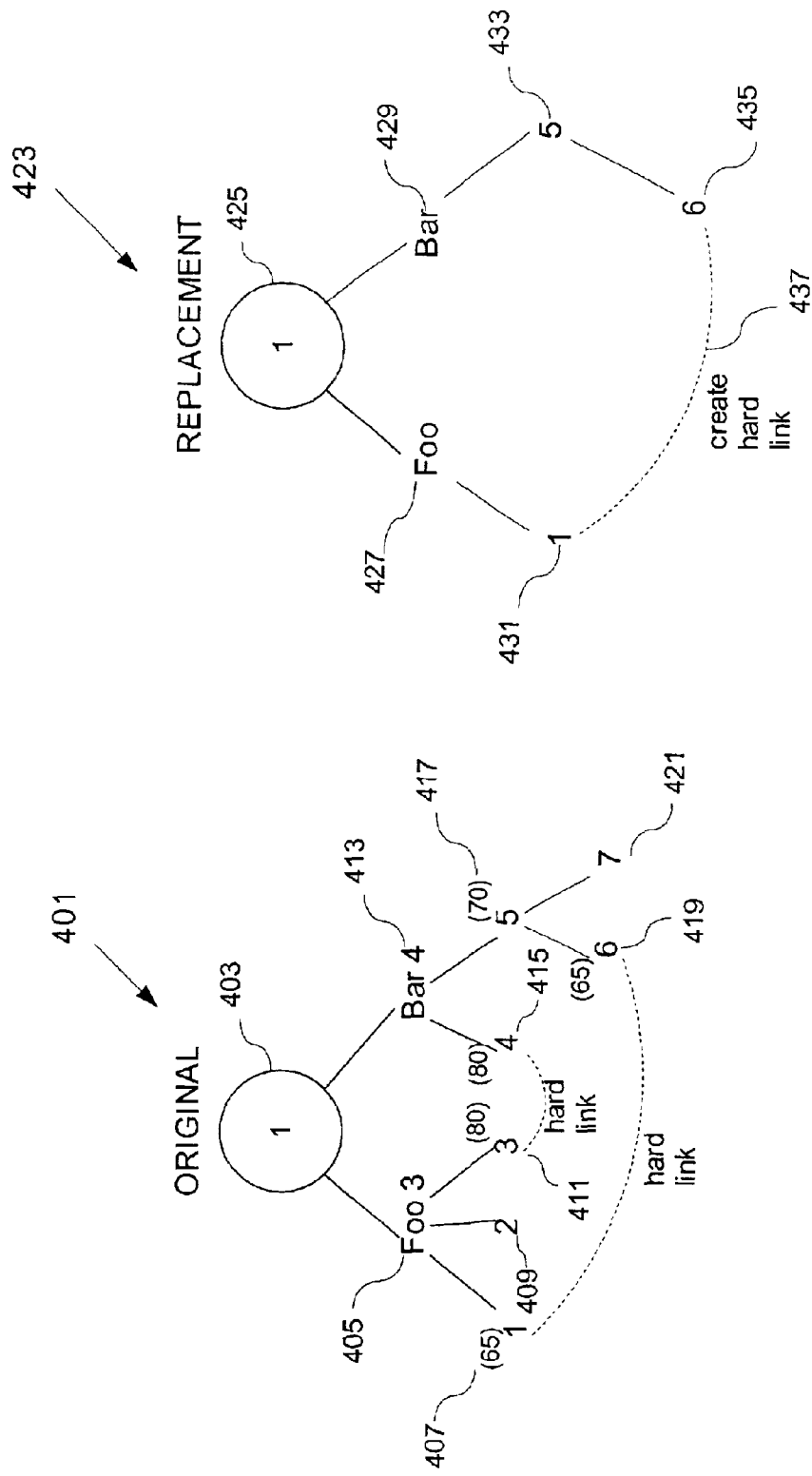
FIG. 10 illustrates directory trees on an original host storage system and on a replacement host storage system for data migrated from the original host storage system to a replacement host storage system, and further illustrating how hard links can be created to maintain hard links between files which previously were related to the same data on the original host storage system.

In a yet still further aspect, when migrating data it also becomes desirable to maintain what are known as "hard links" between files associated with the same data. This is further illustrated in FIG. 10 where directory tree 401 illustrates the pathname in the original host storage system 19 and tree 423 illustrates the pathname in the replacement host storage system 25. Again a root directory 403 is provided with additional directories 405 and 413, and files 407–421. As may be appreciated, there is often the case that two files 411 and 415 refer to the same data. These files are linked together as are files 407 and 419. This type of linking can be done, for example, in an operating system environment such an UNIX, but other operating systems also support such linking. Further, while linking is shown between two files, it is not limited to two and any number of hard links may be preserved. Thus, when data is migrated, as illustrated in tree 423 for the replacement host storage system 25, a hard link 437 must be created for different named files such as 431 and 435 even though the directory tree has changed so as to maintain the same link to the data as was done in the original host storage system 19.

In a more specific aspect, in a typical UNIX file system, there is a unique identifier for a file, which is a called an I-node. The I-node is the true identifier for a file. Inside a directory the file name is actually a name and an I-node number. It is important to appreciate that while this is being discussed in the context of a UNIX operating system, similar type implementations are done in other operating systems. Thus it becomes important to identify which files are linked, and to create those links in the new or replacement host storage system 25.

Figure 11:
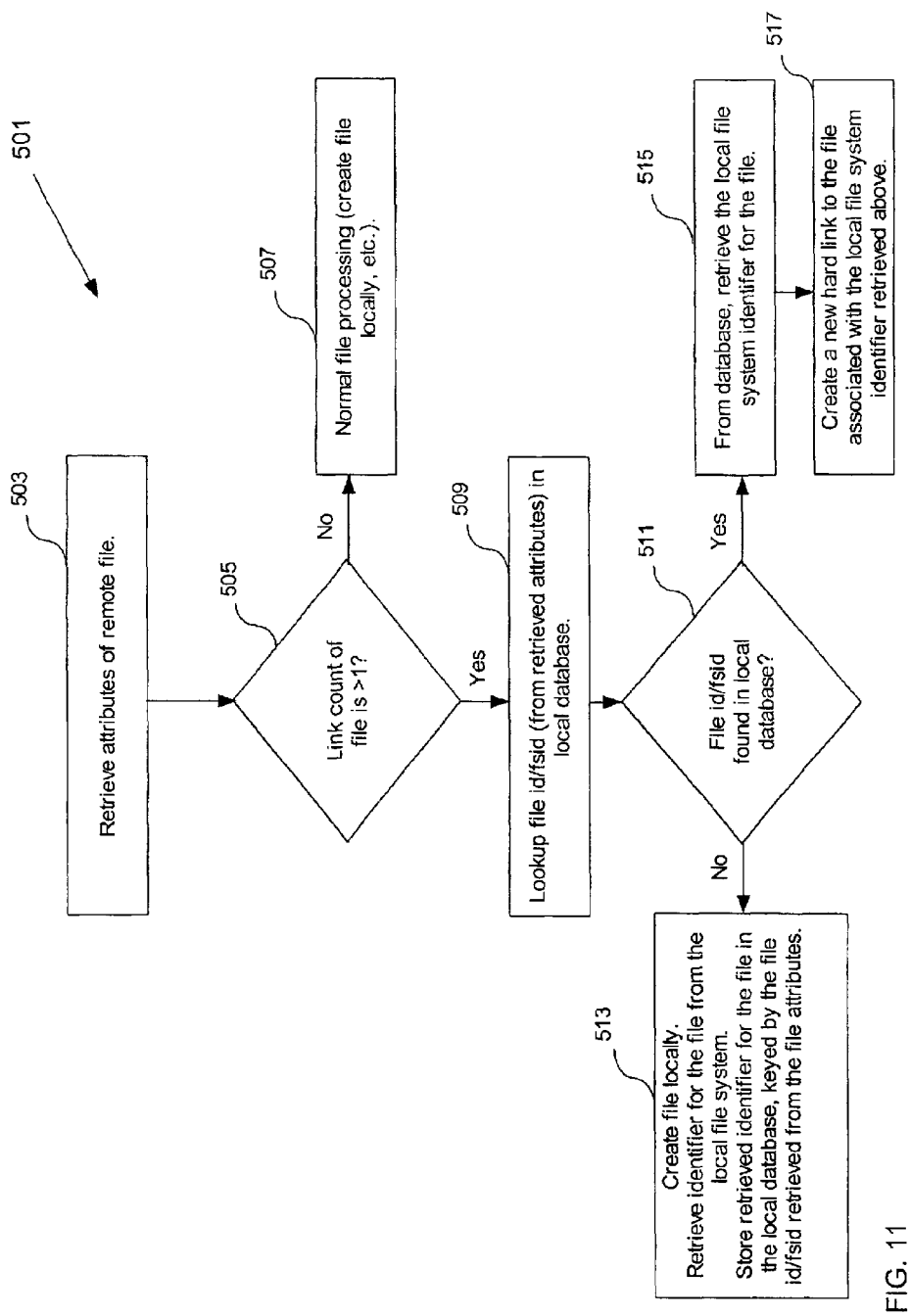
FIG. 11 is a flow diagram illustrating the method of maintaining hard links between files relating to the same data as migration from an original host storage system to a replacement host storage system is conducted.

This is further illustrated in greater clarity in FIG. 11 where flow diagram 501 further shows how the links are determined and created. More specifically, at step 503 the attributes of a remote file residing on the original host storage system 19 are retrieved. At step 505 it is determined if the link count of the file is greater than one, and if the answer is no, normal processing occurs at 507, in which the file is then created in the new or replacement host storage system 25.

If the answer is yes, at step 509 the file id and file system id is determined from the retrieved attributes in the database of the data migration module 39. At step 511 it is determined whether the file id and file system id is found in the database of the replacement host storage system 25. If the answer is yes, then at step 515 the local file system identifier for the file is retrieved from the data migration module 39 database and at step 517 a hard link to the file associated with the file system identifier retrieved is created. If at step 511 the answer is no, then at step 513 the file is created in the replacement host storage system 25 and the identifier retrieved from file system 41. The retrieved identifier for the file is stored in the database of the data migration module 39 keyed by the file id and file system id retrieved from the file attributes.

In another aspect of the systems and methods described herein, it is possible that there may be multiple client requests for acting on data or files in either an environment such as a network connection where data migration is occurring between an original host storage system 19 and a replacement host storage system 25, or simply in simple network operation where migration has already occurred and only the replacement host storage system 25 is connected.

Operation can be made cumbersome if, when there are multiple client requests assigned to different threads, if a thread being processed pends, due for example, to background operations. The remaining threads cannot then be processed efficiently. A client request can include a search for data, for example, to an original host storage system 19 connected or quite simply a write to a file which may be a lengthy operation such as requiring extending the file, creating information about the file on the disk, storing the information back to the disk, and other things which require multiple inputs and outputs in the back-end system. The thread currently being implemented has to wait while those inputs and outputs are being processed. In the meantime, other threads are incapable of being processed.

Thus, in accordance with this aspect, if a thread pends, it relinquishes the process and allows a thread next in the queue to be processed with the thread relinquishing the process returning to the back of the queue.

Figure 12:
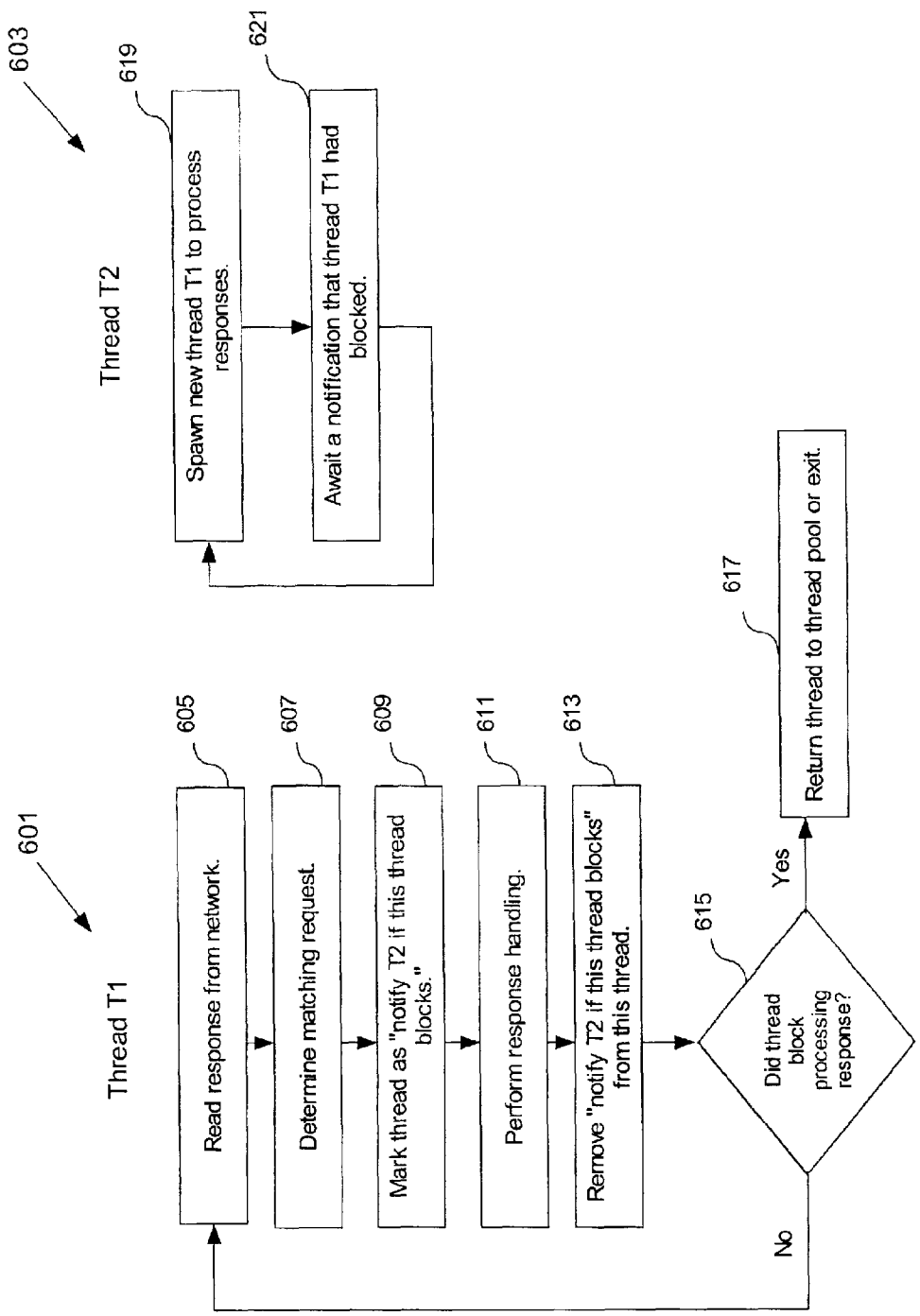
FIG. 12 illustrates how requests from clients to act on data can be efficiently processed in a multi-thread environment when a first thread acting on a request pends.

This operation is illustrated in greater detail in FIG. 12 which shows two threads 601 and 603. The first thread at a step 605 reads a response from the network. At step 607, the request is matched, and at step 609 the thread is marked to notify the thread next in line, i.e, T2, if it pends or blocks. At step 611 the response handling is performed, and the designation of notifying the second thread, T2, if the thread blocks, is removed at step 613.

At step 615 an inquiry is made as to whether the thread blocked the processing response, i.e., pended, and if the answer is yes, it returns to the back of the queue at step 617. If the answer is no, it returns to continue being processed at step 605.

Referring to the process at 603 for the second thread, it becomes the thread, T1, which is being processed at 619 if notified by step 621 that the thread originally being processed had blocked or pended.

Having thus generally described the invention, the same will become better understood from the appended claims, in which it is set forth in a non-limiting manner.

What is claimed is:

1. A method of migrating data from at least one original host storage system to a replacement host storage system on a network, comprising:
   connecting a replacement host storage system to a network, and connecting an original host storage system to the replacement host storage system;
   migrating data from the original host storage system to the replacement host storage system;
   receiving at the replacement host storage system at least one request from a client on the network concerning data stored in at least one of the replacement host storage system and the original host storage system;
   determining if the data requested has been migrated from the original host storage system to the replacement host storage system; and
   if the data requested has been migrated, acting on the client request, and if the data has not been migrated, searching for the data on the original host storage system, copying the data to the replacement host storage system and acting on the client request.
   determining whether additional files or directory data to be migrated exist on the original host storage system; and
   if there are no additional files or directory data existing which require migration, terminating data migration.

2. The method of claim 1, wherein the original host system is connected to the network, and further comprising disconnecting the host system from the network.

3. The method of claim 1, wherein the original host system is connected to the network, and further comprising changing the identity of the original host system.

4. The method of claim 1, further comprising:
   building a database at the replacement host storage system indicative of what data has been migrated from the original host storage system; and if the data has been migrated, having the replacement host storage system file system act on the request.

5. The method of claim 1, further comprising:
   building a database in the replacement host storage system indicative of what data has been migrated from the original host storage system; and if the data has not been migrated, determining original host storage system information about the file and sending the request to the original host storage system for further processing.

6. The method of claim 5, further comprising:
   determining if the data subject to the request is a file or a directory;
   if the data is a file, storing the data in the replacement host storage system file system, and updating data migration information in the database of the replacement host storage system to indicate more data has been migrated and stored;
   if the data is a directory, creating files and subdirectories in the replacement host storage system based on information returned from the original host storage system, creating new records in the database in the replacement host storage system for all newly created files and directories based on information from the original host storage system, and updating information in the replacement host storage system database to indicate that the data has been fully copied; and
   having the replacement host storage system file system act on the request.

7. The method of claim 1, wherein said at least one original host storage system comprises multiple host storage systems.

8. The method of claim 1, further comprising:
   (a) determining whether additional files or directories data to be migrated exist on the original host storage system;
   (b) if additional files or directories data exist, determining which file or directory data is next to be retrieved;
   (c) retrieving the information about the file or directory from the database;
   (d) determining whether the file or directory data is already stored locally; and
   (e) if the file or directory data is already stored on the replacement host storage system, returning to step (a).

9. The method of claim 8, further comprising:
   if at step (d) it is determined the file or directory data is not already stored in the replacement host storage system;
   determining if the data subject to the request is a file or a directory;
   if the data is a file, storing the data in the replacement host storage system file system, and updating data migration information in the database of the replacement host storage system to indicate more data has been migrated and stored;
   if the data is a directory, creating files and subdirectories in the replacement host storage system based on information returned from the original host storage system, creating new records in the database in the replacement host storage system for all newly created files and directories based on information from the original host storage system, and updating information in the replacement host storage system database to indicate that the data has been fully copied; and
   forwarding the request to the replacement host storage system file system.

10. The method of claim 1, wherein said request from a client is at least one of an NFS request, a CIFS request, an FTP request, and another protocol request made of the original host storage system.

11. The method of claim 1, further comprising:
    retrieving the Access Control Lists for directories and files on the original host storage system file system to be migrated to the replacement host storage system; and
    for directories and files that are moved or renamed on the replacement host storage system, storing the original location on the original host storage system during data migration.

12. The method of claim 1 further comprising:
    retrieving the attributes of a remote file having data to be migrated from the original host storage system to the replacement host storage system, and storing the attributes in a database in the replacement host storage system;

determining if the data in the file is linked to only one file or more than one file; and if the data is linked to only one file, creating the file in the replacement host storage system and migrating the data.

13. A method of migrating data from at least one original host storage system to a replacement host storage system on a network, comprising:

connecting a replacement host storage system to a network, and connecting an original host storage system to the replacement host storage system;

migrating data from the original host storage system to the replacement host storage system;

receiving at the replacement host storage system at least one request from a client on the network concerning data stored in at least one of the replacement host storage system and the original host storage system;

determining if the data requested has been migrated from the original host storage system to the replacement host storage system;

if the data requested has been migrated, acting on the client request; and if the data has not been migrated, searching for the data on the original host storage system, copying the data to the replacement host storage system and acting on the client request, said copying comprising;

retrieving attributes of a remote file having data to be migrated from the original host storage system to the replacement host storage system, and storing the attributes in a database in the replacement host storage system;

determining if the data in the file is linked to only one file or more than one file, and if the data is linked to only one file, creating the file in the replacement host storage system and migrating the data;

if the data in the file is linked to more than one file, looking up the file id and file system id from the retrieved attributes in the database in the replacement host system;

determining if the file id and file system id are found in the database;

if the file id and file system id are found in the database, retrieving the replacement host system identifier for the file and creating a hard link to the file associated with the file system identifier retrieved; and if the file id and file system id are not found in the database, creating the file in the replacement host storage system, retrieving the identifier for the file from the replacement host storage system file system, and storing the retrieved identifier for the file in the database keyed by the file id and file system id retrieved from the attributes.

14. The method of claim 13, further comprising:

building a database in the replacement host storage system indicative of what data has been migrated from the original host storage system; and if the data has not been migrated, determining original host storage system information about the file and sending the request to the original host storage system for farther processing.

15. The method of claim 13, further comprising:

retrieving an Access Control List for directories and files on the original host storage system file system to be migrated to the replacement host storage system; and for directories and files that are moved or renamed on the replacement host storage system, storing the original location on the original host storage system during data migration.

16. The method of claim 13, further comprising:

(a) determining whether additional files or directories data to be migrated exist on the original host storage system;

(b) if additional files or directories data exist, determining which file or directory data is next to be retrieved;

(c) retrieving the information about the file or directory from the database;

(d) determining whether the file or directory data is already stored locally; and (e) if the file or directory data is already stored on the replacement host storage system, returning to step (a); and (f) if there are no additional files or directory data existing which require migration, terminating data migration.

17. A method of migrating data from at least one original host storage system to a replacement host storage system on a network, comprising:

connecting a replacement host storage system to a network, and connecting an original host storage system to the replacement host storage system;

migrating data from the original host storage system to the replacement host storage system;

receiving at the replacement host storage system at least one request from a client on the network concerning data stored in at least one of the replacement host storage system and the original host storage system;

in the event of multiple client requests, processing client requests in accordance with a queue and processing threads;

for a thread processing a request, instructing the thread to notify the next thread if it pends;

if the thread processing a request pends, terminating processing by that thread and beginning processing the next thread in the queue, and returning the thread that pends to the end of the queue to later process the request:

for each request, determining if the data requested has been migrated from the original host storage system to the replacement host storage system; and if the data requested has been migrated, acting on the client request, and if the data has not been migrated, searching for the data on the original host storage system, copying the data to the replacement host storage system and acting on the client request.

18. The method of claim 17, further comprising:

building a database in the replacement host storage system indicative of what data has been migrated from the original host storage system; and if the data has not been migrated, determining original host storage system information about the file and sending the request to the original host storage system for further processing.

19. The method of claim 17, further comprising:

retrieving an Access Control Lists for directories and files on the original host storage system file system to be migrated to the replacement host storage system; and for directories and files that are moved or renamed on the replacement host storage system, storing the original location on the original host storage system during data migration.

20. The method of claim 17, further comprising:

(a) determining whether additional files or directories data to be migrated exist on the original host storage system;

(b) if additional files or directories data exist, determining which file or directory data is next to be retrieved;

(c) retrieving the information about the file or directory from the database;

(d) determining whether the file or directory data is already stored locally; and (e) if the file or directory data is already stored on the replacement host storage system, returning to step (a); and (f) if there are no additional files or directory data existing which require migration, terminating data migration.

* * * * *

UNITED STATES PATENT AND TRADEMARK OFFICE
CERTIFICATE OF CORRECTION

PATENT NO.    : 6,922,761 B2
DATED         : July 26, 2005
INVENTOR(S)   : O'Connell et al.

It is certified that error appears in the above-identified patent and that said Letters Patent is hereby corrected as shown below:

Column 12,
Line 58, replace the word "Lists" with -- List --.

Column 13,
Line 66, replace the word "farther" with -- further --.

Column 14,
Line 65, replace the word "Lists" with -- List --.

Signed and Sealed this

Twenty-seventh Day of September, 2005

JON W. DUDAS
*Director of the United States Patent and Trademark Office*